United States Patent
Bauer et al.

(10) Patent No.: US 9,319,108 B2
(45) Date of Patent: Apr. 19, 2016

(54) SYSTEM FOR CONTACTLESS TRANSFER OF ENERGY AND DATA AND VEHICLE WITH SUCH A SYSTEM

(71) Applicant: Airbus Operations GmbH, Hamburg (DE)

(72) Inventors: Hans-Achim Bauer, Hamburg (DE); Andre Zybala, Hanstedt (DE)

(73) Assignee: Airbus Operations GmbH (DE)

( * ) Notice: Subject to any disclaimer, the term of this patent is extended or adjusted under 35 U.S.C. 154(b) by 561 days.

(21) Appl. No.: 13/871,134

(22) Filed: Apr. 26, 2013

(65) Prior Publication Data

US 2013/0285442 A1    Oct. 31, 2013

Related U.S. Application Data

(60) Provisional application No. 61/639,249, filed on Apr. 27, 2012.

(30) Foreign Application Priority Data

Apr. 27, 2012 (DE) .......................... 10 2012 008 540

(51) Int. Cl.
    *H01F 27/42* (2006.01)
    *B60L 1/00* (2006.01)
    (Continued)

(52) U.S. Cl.
    CPC ............... *H04B 5/0037* (2013.01); *H02J 5/005* (2013.01); *H04B 5/0031* (2013.01); *H04B 5/0075* (2013.01); *B64D 11/0015* (2013.01); *B64D 2221/00* (2013.01)

(58) Field of Classification Search
    CPC ........... H02J 17/00; H02J 5/005; H02J 7/025; H01F 38/14; H01F 27/006; H01F 27/42; B60L 11/1829; B60L 1/00; H04B 5/0037
    See application file for complete search history.

(56) References Cited

U.S. PATENT DOCUMENTS

| | | | | |
|---|---|---|---|---|
| 5,455,466 A | * | 10/1995 | Parks | ...................... H02J 7/025 307/104 |
| 5,559,377 A | * | 9/1996 | Abraham | ................. H04B 3/56 307/104 |

(Continued)

FOREIGN PATENT DOCUMENTS

| DE | 3413242 A1 | 10/1985 |
|---|---|---|
| DE | 102008024217 A1 | 12/2009 |

(Continued)

*Primary Examiner* — Kenneth B Wells
*Assistant Examiner* — Rafael Pacheco
(74) *Attorney, Agent, or Firm* — Lerner, David, Littenberg, Krumholz & Mentlik, LLP

(57) ABSTRACT

A system for the contactless transfer of energy and data includes a transfer path with a primary coil and with a secondary coil. The primary control unit is designed to lead data-modulated first alternating-voltage signals of a first frequency range into the primary coil. The secondary control unit is designed to receive the first alternating-voltage signals of the first frequency range from the secondary coil, and to demodulate the modulated-on data. The system further includes a feed-in line for feeding a second alternating-voltage signal of a second frequency range to a primary line leading to a primary coil and an activation line that is connected to a secondary line that is connected to the secondary coil. A first filter filters the second alternating-voltage signal from the secondary line and provides the signal to an activation connection.

14 Claims, 2 Drawing Sheets

(51) Int. Cl.
*H04B 5/00* (2006.01)
*H02J 5/00* (2006.01)
*B64D 11/00* (2006.01)

(56) References Cited

U.S. PATENT DOCUMENTS

| | | | |
|---|---|---|---|
| 5,856,710 A | 1/1999 | Baughman et al. | |
| 8,164,215 B2 | 4/2012 | Bauer et al. | |
| 2005/0225188 A1* | 10/2005 | Griepentrog | H01F 38/18 |
| | | | 310/112 |
| 2009/0295223 A1* | 12/2009 | Bauer | B60R 16/027 |
| | | | 307/9.1 |
| 2010/0285747 A1* | 11/2010 | Bauer | H01F 38/14 |
| | | | 455/41.1 |
| 2011/0146686 A1 | 6/2011 | Schneider et al. | |
| 2011/0299470 A1 | 12/2011 | Muller et al. | |

FOREIGN PATENT DOCUMENTS

| | | |
|---|---|---|
| DE | 102008028258 A1 | 12/2009 |
| EP | 2168635 A1 | 3/2010 |
| WO | 2010092152 A1 | 8/2010 |

\* cited by examiner

SYSTEM FOR CONTACTLESS TRANSFER OF ENERGY AND DATA AND VEHICLE WITH SUCH A SYSTEM

CROSS-REFERENCE TO RELATED APPLICATIONS

This application claims the benefit of the filing date of U.S. Provisional Patent Application No. 61/639,249, filed Apr. 27, 2012, the disclosure of which is hereby incorporated herein by reference.

TECHNICAL FIELD

The invention relates to a system for the contactless transfer of energy and data and to a vehicle with such a system.

BACKGROUND OF THE INVENTION

In the state of the art, systems for the transfer of energy and data are known. In vehicles such systems may be used for providing energy or data for an on-board entertainment system, for illuminating devices or the like. Contactless transfer between a first vehicle part and a second vehicle part that is movable relative to the aforesaid makes it possible, for example, to electrically effortlessly connect rapidly reconfigurable passenger cabins of a vehicle with variably-positionable seats or devices arranged above seats to higher-level systems of the vehicle.

In larger vehicles, for example in commercial aircraft, the safety of the design of technical devices is prescribed in several levels, depending on the intended criticality of the application of the devices under consideration. Apart from applications that are critical to the survival of passengers and to the integrity of the vehicle, furthermore, less critical or non-critical applications are imaginable. These gradations are often referred to as "design assurance levels (DALs)", wherein DAL level "A" is used for particularly critical applications, and DAL level "E" for particularly non-critical applications. The supply of electrical current and data to devices of DAL level A thus needs to be considerably more reliable or considerably safer than the supply to devices for applications of DAL level E. Cabling of release mechanisms of compartments for oxygen masks in cabins of commercial aircraft is predominantly carried out to DAL level B.

DE 10 2008 024 217 A1 discloses a system for contactless energy and data transfer, in which system a transducer/transformer is formed between the first vehicle part and the second vehicle part. Apart from the transfer of energy, data is transferred as alternating-voltage signals that are modulated onto a carrier signal with a carrier frequency.

The electrical connection of devices with stringent safety requirements, for example of release mechanisms of compartments for oxygen masks, on board commercial aircraft is usually implemented by separate cabling arrangements in order to achieve a high DAL level. In contrast to the aforesaid, devices in a passenger service unit (PSU), which devices are located above seats whose positions are variable, may be electrically connected, by means of a system for contactless energy and data transfer, to a higher-level system of the commercial aircraft. Since in a PSU the loudspeakers, lights or operating buttons have only relatively low application criticality, the contactless data and energy transfer system used for this may have a relatively low DAL level. However, this excludes the connection of critical devices, for example the release mechanisms for mask compartments, to such a system. However, adapting conventional cabling arrangements after reconfiguration of the cabin would result in additional cabling effort and expenditure.

BRIEF SUMMARY OF THE INVENTION

Accordingly an aspect of the invention proposes a system for transferring a signal, for example between a first vehicle part and a second vehicle part, which is movable relative to the first vehicle part, in which system there is no need to provide a wire-bound coupling, while nevertheless a higher DAL level may be achieved than is implementable by means of a known system for contactless energy and data transfer.

A system for the contactless transfer of energy and data comprises a transfer path with a primary coil, connected by way of a primary line to a primary control unit, and a secondary coil, connected by way of a secondary line to a secondary control unit, wherein the primary control unit is designed to lead data-modulated first alternating-voltage signals of a first frequency range into the primary coil, and the secondary control unit is designed to receive alternating-voltage signals of the first frequency range from the secondary coil, and to demodulate the modulated-on data. The system according to an embodiment of the invention further comprises a feed-in line connected to the primary line, an activation line connected to the secondary line, and a first filter arranged between the secondary line and an activation connection, which first filter is permeable to second alternating-voltage signals of a second frequency range while blocking the first alternating-voltage signals of the first frequency range.

Within the scope of the invention, a system for contactless energy and data transfer, which system is for example known from DE 10 2008 024 217 A1, may be modified to such an extent that despite the primary control units and secondary control units necessary for data transfer, which primary control units and secondary control units in a conventional design for use in non-critical functions have an inferior DAL level than do devices for critical functions, may nevertheless be used for the transfer of an additional signal or of an alternating voltage for controlling devices with significantly more critical safety requirements. The reliability of transfer of the second alternating-voltage signal is very high, because exclusively passive components are used that are technically mature and that preclude the occurrence of logic-related failures.

In this context it is mentioned that the primary coil is preferably arranged in a vehicle-fixed or structure-fixed manner, i.e. in a fixed position within the vehicle, on a first vehicle part, thus forming a primary strand with the first connecting line and with the primary control unit, which primary strand is, for example, connected to a higher-level vehicle system. The first vehicle part may thus be a vehicle-fixed or structure-fixed component. It goes without saying that in order to improve the electromagnetic characteristics the primary coil is arranged in a primary core that comprises any form suitable for forming a transducer/transformer with a secondary coil. The primary coil or the primary core should be positioned in such a manner that alignment of a secondary coil results in the formation of a transducer/transformer.

The secondary coil may, furthermore, be arranged in a movable second vehicle part. Movability relates to the suitability of assuming various positions within the vehicle if required. This may apply in the context of reconfiguration of the passenger cabin, in which the seat pitch of passenger seats is changed in order to vary, even temporarily, the number of seats in various classes. The second vehicle part may, for example, comprise a PSU in a vehicle cabin, or may be connected to said PSU, wherein in order to achieve reconfigurability of a passenger cabin the PSU may be arranged above movable passenger seats, aligned with said passenger seats, at various positions on stowage compartment panels or cover panels. Accordingly, the devices contained therein are supplied with electrical power and data by way of the transfer path comprising the primary coil and the secondary coil, which power and data are tapped by way of the secondary line and the secondary control unit as a secondary strand. In this arrangement, too, it is understood that the secondary coil should be arranged in a secondary core in order to improve the magnetic characteristics.

Furthermore, in the context of their use in a cabin of a commercial aircraft it is imaginable to distribute a number of spaced apart primary coils over the cabin, with which primary coils secondary coils may form a transducer/transformer. In this arrangement the spacing of the primary coils relative to each other may be constant or variable. With the design of the primary coils in an elongated shape, because of the improved coverage the number of necessary primary coils may be reduced, although nevertheless great flexibility of positioning of the second vehicle parts is ensured.

The data received by the primary control unit is modulated onto an alternating-voltage signal with this carrier frequency so that transfer by way of the primary coil to the secondary coil may occur, in which location the data are demodulated and made available. The achievable data rates in the transfer of energy and data by way of the transfer path depend on the carrier frequency, i.e. on the frequency of the first alternating-voltage signal without modulated-on data, which frequency is in the first frequency range. In order to achieve acceptable data transfer rates on board vehicles, the use of a frequency of several 100 kHz or higher is recommended. Accordingly, the first frequency range may, for example, be in the range of 50 kHz to 10 MHz; however, depending on required data rates it may significantly exceed these boundaries.

The second alternating-voltage signal of the second frequency range, which signal is applied only when required, may be superimposed in a completely transparent manner on the first alternating-voltage signal of the first frequency range if the first frequency range and the second frequency range differ significantly. Advantageously, the boundaries of the first frequency range and of the second frequency range differ by a factor of 10 to 10,000, wherein the first frequency range covers higher frequencies than the second frequency range. Depending on the required data rates of the system, lower or considerably higher factors are also imaginable. In this manner the second alternating-voltage signal may transfer by way of the same transfer path into the secondary coil and in that location may reliably and precisely be filtered out by the correspondingly dimensioned first filter, without this resulting in interference by the first alternating-voltage signal. By means of the first filter, which lets the second alternating-voltage signal pass through to an activation connection, reliable transfer, of the second alternating-voltage signal, by way of the activation connection, to the critical device may be achieved.

The first filter may be designed as a low-pass filter that is, for example, implemented as a first-order high pass in the form of an RC element. In this arrangement the reciprocal value of the product of the capacitance of the capacitor and the size of the resistor would be proportional to an achievable limiting frequency of the low-pass filter.

In summary, it is a core aspect of the invention that for the transfer of an additional signal for a safety-critical device an already existing transfer path of a system for the contactless transfer of energy and data is used, while the primary and secondary control units connected to the system are, however, totally disregarded in order to ensure improved safety and reliability. Only a primary line, which extends in the primary strand between the primary control unit and the primary coil, is subjected to the additional second alternating-voltage signal, which is to be transferred, from the second frequency range, which second alternating-voltage signal is transferred into the secondary coil and is fed to the corresponding device already prior to reaching a secondary control unit present in the secondary strand.

An advantageous embodiment comprises a switching device with a signal output, which switching device is designed to controllably apply an alternating-voltage signal from the second frequency range to the signal output, wherein the signal output is connected to the feed-in line. In this manner it is possible to selectively, for example by activating a switch, a pushbutton or some other suitable device for carrying out or initiating a switching process, to feed a second alternating-voltage signal of the second frequency range into the feed-in line. The switching device may comprise a switching unit in the form of a mechanical or electronic relay. The switching device may resemble an oxygen-switching device of a commercial aircraft, or it may be an oxygen-switching device, which switching device according to the state of the art by way of a cable-bound connection makes it possible to activate or release oxygen masks from a mask container.

In an advantageous embodiment the switching device is connected to a pressure sensor and is designed to lead the alternating-voltage signal of the second frequency range to the signal output if the pressure level falls below a predetermined air pressure. In particular for use in a commercial aircraft this provides an advantage in that, if the pressure falls below a tolerable absolute pressure in the cabin, a first alternating-voltage signal may automatically be transferred to release mechanisms in second vehicle parts, which release mechanisms may, for example, comprise mask containers designed for the automatic release or deployment of oxygen masks from corresponding mask containers.

In an advantageous embodiment the activation connection is connected to at least one actuator that is designed to carry out a movement when a second alternating-voltage signal is present. This may, in particular, be used for unlocking cover flaps that are arranged on mask containers that contain oxygen masks. Particularly preferably such containers comprise a snap-lock mechanism in which a spring-loaded latch holds the container flap in a closed position by means of a positive locking connection. If the actuator is moved when the second alternating-voltage signal is released, the latch may be released, against the spring tension, from the positive locking connection so that the cover flap is released from its closed position either controlled by gravity or under the influence of a further spring force.

In an advantageous embodiment of the invention the second frequency range may extend from 50 Hz to 1,000 Hz. This includes the most frequently used alternating-voltage frequencies that may be used for releasing, activating or operating electrical devices in a vehicle. While an alternating voltage commonly used in households may be approximately 50 Hz, in a commercial aircraft alternating voltages ranging between 380 and 800 Hz are often used. Furthermore, it makes sense to select an extent of the voltage, which extent is common in vehicles, from a range of 12 V to 300 V, for example 115 V. The second alternating-voltage signal may also be implemented in the form of a pulsed direct-voltage signal, wherein for this purpose at least one voltage impulse is introduced into the feed-in line. The extent of the voltage is to be selected in such a manner that the transferred impulses transfer sufficient energy for the devices to be operated.

The extent of the voltage of the second alternating-voltage signal to be transferred depends on the type of the device to be controlled. In this arrangement, the strand commencing from the feed-in line up to the activation connection is to be regarded as a replacement of a cable.

In a further advantageous embodiment a first decoupling transmitter is arranged in the feed-in line. The impedance of the primary line may thus be decoupled from the source of the second alternating-voltage signal, and in particular from the feed-in line, so that any interference in the primary line and in the system for contactless energy and data transfer per se does not affect the integrity of a device that generates the second alternating-voltage signal. In addition to this, the electrical characteristics of the feed-in line, of the activation line and of all the connected devices essentially need not be taken into account in the design of the transfer path.

Likewise, in an advantageous embodiment a second decoupling transmitter is arranged in the activation line. The second alternating-voltage signal is supplied by way of the second decoupling transmitter to the device to be controlled.

A further advantageous embodiment comprises a second filter in the feed-in line, which second filter corresponds to the first filter. In this manner it is possible to prevent first alternating-voltage signals transferred into the secondary line from reaching the activation line.

In a further advantageous embodiment a third filter is arranged in the primary line, and a fourth filter is arranged in the secondary line, wherein the third and the fourth filters are permeable to alternating-voltage signals from the first frequency range, while blocking them from the second frequency range. This prevents the primary control unit and the secondary control unit from being subjected to second alternating-voltage signals that may result in a malfunction. In this design the third filter is arranged between the primary control unit and the connection of the feed-in line, while the fourth filter is arranged between the secondary control unit and the connection of the activation line. Since the third filter and the fourth filter are to be permeable to significantly higher frequencies than the first filter and the second filter, the aforesaid may, for example, be designed as a high pass.

The invention furthermore relates to a vehicle comprising a system as described above for the contactless transfer of energy and data. In this arrangement the vehicle is preferably an aircraft. Preferably, the vehicle comprises at least one first vehicle part and at least one second vehicle part that is movable relative to the first vehicle part, wherein at least one primary coil is arranged on the at least one first vehicle part, and a secondary coil is arranged on the at least one second vehicle part.

In a preferred embodiment the first vehicle part is a vehicle-fixed component. This may be a covering element in a cabin, a stiffening or reinforcement element, a mount, a floor element or some similar equipment component or structural component. It may make sense, for example, as a first vehicle part to use a ceiling panel, overhead bins, a lateral lining or adjacent fixed parts in a vehicle cabin, in order to subject movably arranged second vehicle parts at a very high safety level to the second alternating-voltage signal from the second frequency range as required.

In a preferred embodiment the second vehicle part comprises a container for oxygen masks, which container comprises a release mechanism that is connected to the activation connection and that opens the container when it receives the second alternating-voltage signal. The container may comprise a cover element that is preferably designed as a hinged lid. The release mechanism of the container keeps the cover element in a closed position and is connected to the activation connection so that when the second alternating-voltage signal is transferred an actuator integrated in the container activates the release mechanism, thereby releasing or deploying the oxygen mask.

In an equally preferred embodiment, the vehicle comprises a multitude of spaced-apart primary coils on one or several first vehicle parts, as well as a multitude of second vehicle parts, on which secondary coils are arranged that may be made to align in each case with at least one primary coil. The primary coils may be arranged in a grid-like manner in order to form transducers/transformers with secondary coils at various locations in the vehicle.

BRIEF DESCRIPTION OF THE DRAWINGS

Further features, advantages and application options of the present invention are disclosed in the following description of the exemplary embodiments and of the figures. All the described and/or illustrated features per se and in any combination form the subject of the invention, even irrespective of their composition in the individual claims or their interrelationships. Furthermore, identical or similar objects in the figures have the same reference characters.

DETAILED DESCRIPTION

Figure 1:
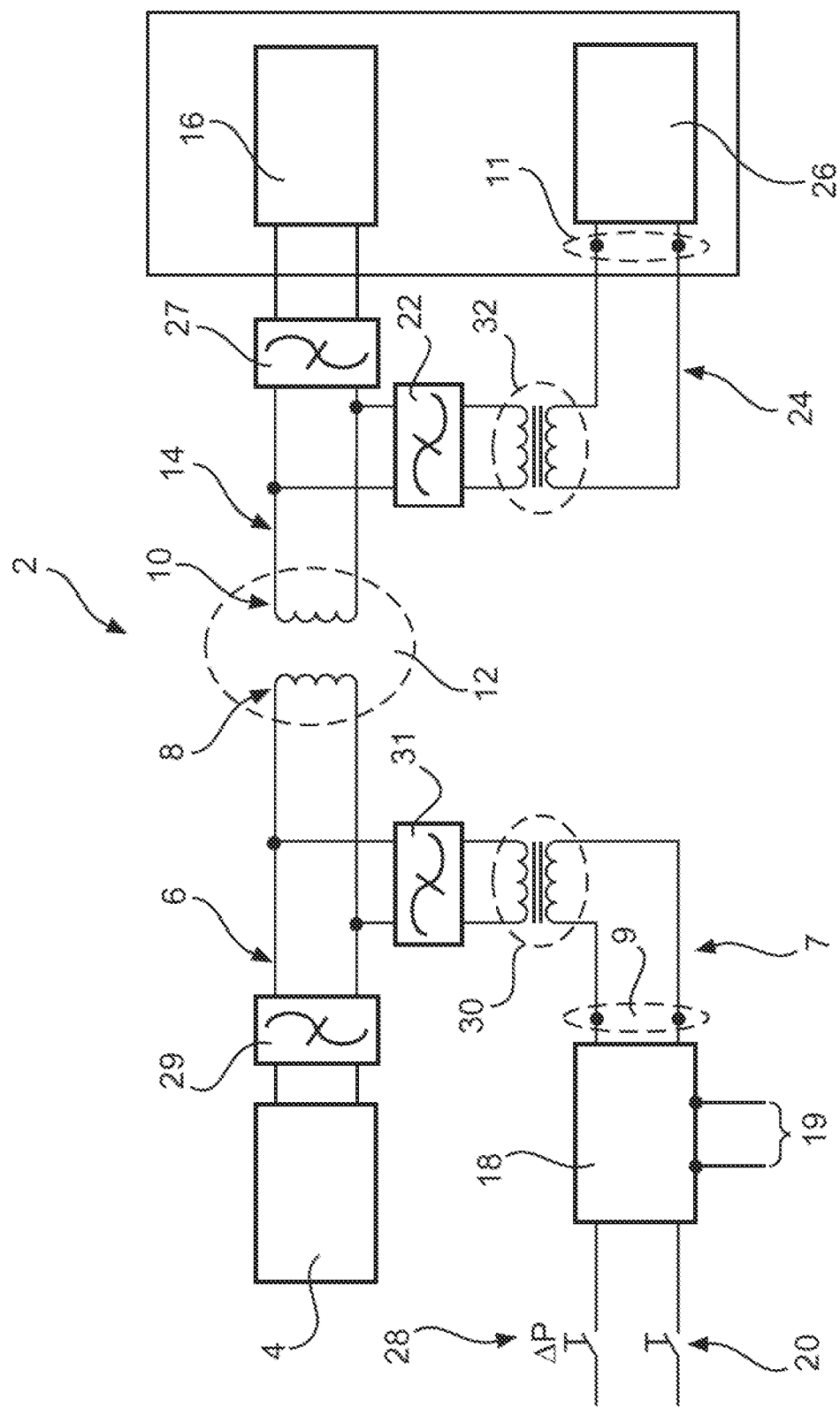
FIG. 1 shows a diagrammatic view of a system according to the invention for contactless energy and data transfer.

FIG. 1 shows a system according to an embodiment of the invention for contactless energy and data transfer 2. For the transfer of energy and data, as described in more detail in DE 10 2008 024 217 A1, a primary control unit 4 is used that modulates the data by way of alternating-voltage signals onto a carrier voltage at a carrier frequency and leads it as a first alternating-voltage signal by way of a primary line 6 to a primary coil 8. The primary coil 8 is arranged, for example, on a first vehicle part (not shown in this diagram), wherein this first vehicle part is preferably firmly fastened in a cabin or in some other location of a vehicle.

A second vehicle part, which is movable relative to the first vehicle part, may accommodate a secondary coil 10 which by approximate positioning or alignment with the primary coil 8 forms a transducer/transformer 12. This means that alternating voltages applied to the primary coil 8 are induced into the secondary coil 10, from where, by way of a second connecting line 14, they reach a secondary control unit 16. There the modulated-on alternating-voltage signals are separated, by means of a filter (not shown) integrated in the secondary control unit 16, from the carrier frequency and are reconverted to data streams.

Accordingly, a command for activating or operating a device may be transferred by sending a signal from the primary control unit 4 to the secondary control unit 16. In the secondary control unit 16 the command may be converted by releasing an operating voltage to the corresponding device. Because of the multiple conversion of data to alternating-voltage signals and back, which apart from the analog signal circuit may also comprise corresponding logic and implementation to a protocol-based transfer system, such a system is primarily intended for devices that have relatively low safety criticality. For example, in the case of a malfunction in one of the two control units, the entire communication between the two control units may break down unless correspondingly redundant measures are provided. Accordingly, the use of such systems to control vital devices does not suggest itself per se.

By applying an additional, second, alternating-voltage signal to the first connecting line 6, said second alternating-voltage signal may also be transferred, by way of the transducer/transformer 12 comprising the primary coil 8 and the secondary coil 10, to the second connecting line 14. The special feature consists of implementing the application of this second alternating-voltage signal in such a manner that exclusively passive electronic components are used. This may be achieved by the use of an alternating-voltage source that is present at an alternating-voltage input 19 of a switching device 18 and that may be connected by means of a switch 20.

By operating the switch 20 an alternating voltage of a comparatively low frequency of a first frequency range of, for example, 50 to 1000 Hz and preferably of 380 Hz to 800 Hz is applied by way of a signal output 9 and a feed-in line 7 to the first connecting line 6 so that apart from the first alternating-voltage signal with a significantly higher carrier frequency starting from the primary control unit 4 also a low-frequency second alternating-voltage signal is transferred in a superimposed manner to the second connecting line 14. By means of a corresponding first filter 22, which is designed to let through alternating voltages of frequencies from the first frequency range, and which is connected to the secondary line 14, it is possible to exclusively transfer this low-frequency second alternating-voltage signal to an activation line 24 that by way of an activation connection 11 controls the device 26 to be activated. The signal path from the switch 20 to the activating device 26 is thus completely passive.

In addition or as an alternative, the switching device 18 may also be operated by means of a pressure switch 28 which, for example if the pressure falls to below a defined cabin pressure in the cabin of a vehicle, also causes the switching device 18 to emit a first alternating-voltage signal to the primary line.

In addition, damage to the system for contactless energy and data transfer or damage to a device connected thereto may be prevented in that, for example, between the switching device 18 and the first connecting line 6 a decoupling transmitter 30 is arranged which forwards an alternating-voltage signal essentially in an unchanged manner, except galvanically separated. In addition, a second filter 31 is imaginable that exclusively lets through alternating-voltage signals comprising a frequency from the second frequency range. In this manner it is possible to prevent the entry of high-frequency first alternating-voltage signals from the primary control unit 4 by way of the switching device 18 to a higher-level system.

Likewise, on the second connecting line 14 a second decoupling transmitter 32 may be arranged that also emits to the device 26 to be activated an alternating-voltage signal, essentially unchanged, which alternating-voltage signal is present.

In the primary line 6 a third filter 29 may be arranged that blocks second alternating-voltage signals from a second frequency range, while letting the high-frequency first alternating-voltage signals from the primary control unit 4 pass through. Furthermore, a fourth filter 27 may be arranged on the secondary line 14, which further filter 27 exclusively lets high-frequency first alternating-voltage signals pass through to the secondary control unit 16, while the second alternating-voltage signals are blocked.

Figure 2:
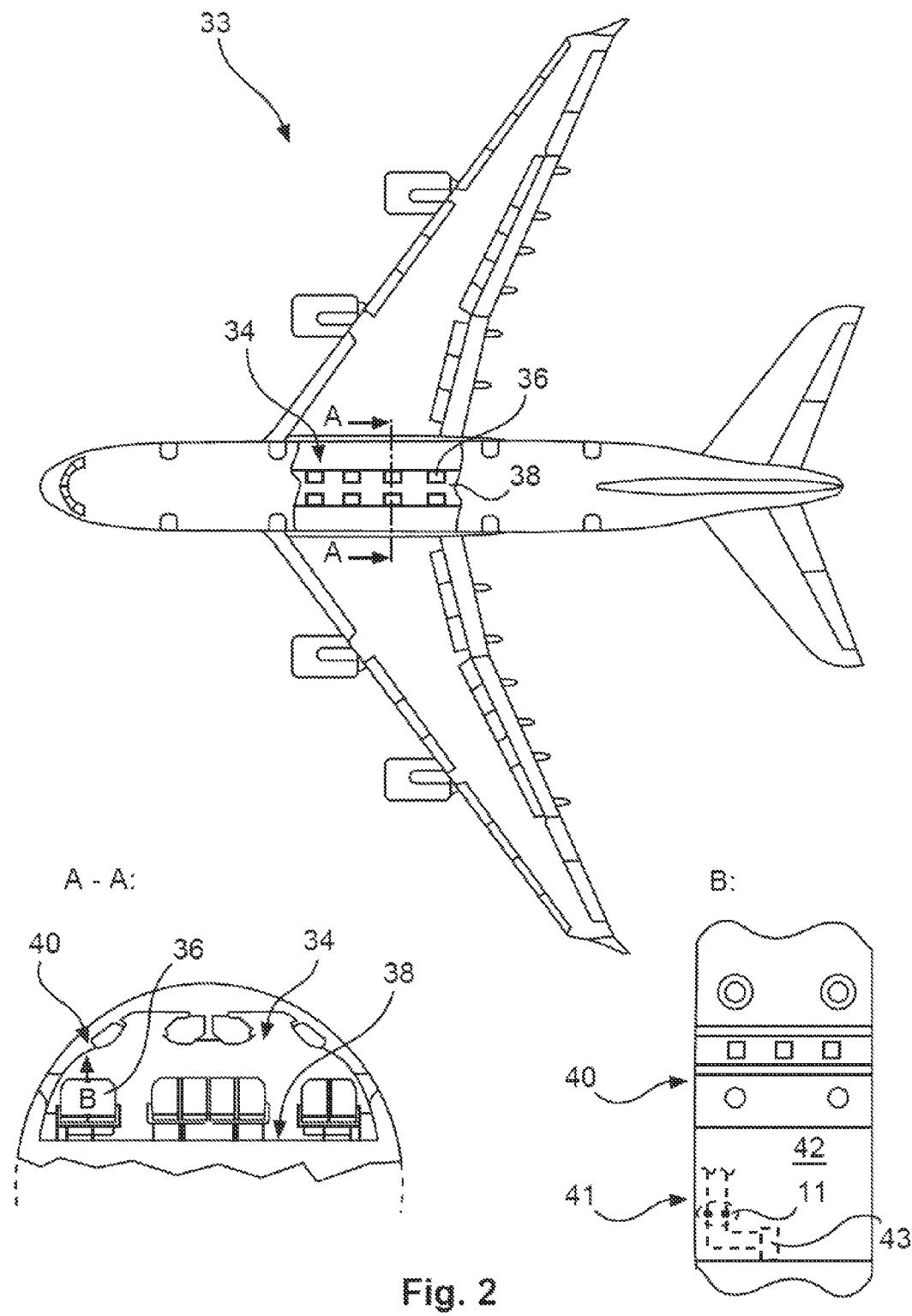
FIG. 2 shows an aircraft with a system for contactless energy and data transfer arranged therein, and with several devices electrically supplied by means of the aforesaid.

FIG. 2 shows an aircraft 33 with a cabin 34 in which several seats 36 are arranged on a cabin floor 38. PSUs 40, which comprise loudspeakers, switches, air nozzles and the like, are arranged above the seats 38. Furthermore, integrated in the PSUs 40 or adjacent to them there are oxygen mask containers 41 with cover flaps 42. The latter may be opened by means of a corresponding signal with the use of a corresponding release mechanism 43 so that oxygen masks (not shown) are deployed that are supplied with oxygen by means of an oxygen system. In order to transfer electrical energy to an actuator (not shown separately) contained in the release mechanism 43, the system according to the invention according to FIG. 1 may be used, whose activation connection 11 is connected to the release mechanism 43. For this purpose it is not necessary to establish separate, wire-bound, connections; instead, the already existing contactless energy and data transfer system may be used that is used for other, non-vital, purposes. Because of the slidability of PSUs 40 in the reconfigurability of the cabin 34 with slidable seats 36 it is also possible to slide the oxygen mask containers 41 with the seats 36 so that it is also not necessary to carry out adaptation work relating to the electrical control of these containers 41.

In addition, it should be pointed out that "comprising" does not exclude other elements or steps, and "a" or "one" does not exclude a plural number. Furthermore, it should be pointed out that features or steps which have been described with reference to one of the above exemplary embodiments may also be used in combination with other features or steps of other exemplary embodiments described above. Reference characters in the claims are not to be interpreted as limitations.

The invention claimed is:

1. A system for the contactless transfer of energy and data, comprising a transfer path with at least one primary coil, connected by way of a primary line to a primary control unit, and at least one secondary coil connected by way of a secondary line to a secondary control unit,
wherein the primary control unit is configured to lead data-modulated first alternating-voltage signals of a first frequency range into the primary coil, and
wherein the secondary control unit is configured to receive the first alternating-voltage signals of the first frequency range from the secondary coil, and to demodulate the modulated-on data;
a feed-in line connected to the primary line,
an activation line connected to the secondary line, and
a first filter arranged between the secondary line and an activation connection,
wherein the first filter is permeable to second alternating-voltage signals of a second frequency range while blocking the first alternating-voltage signals of the first frequency range.

2. The system of claim 1, further comprising a switching device with a signal output, said switching device configured to controllably apply an alternating-voltage signal from the second frequency range to the signal output, wherein the signal output is connected to the feed-in line.

3. The system of claim 2, wherein the switching device is connected to a pressure sensor and is configured to lead the alternating-voltage signal of the second frequency range to the signal output if the pressure level falls below a predetermined air pressure.

4. The system of claim 1, wherein the activation connection is connected to at least one actuator configured to carry out a movement when a second alternating-voltage signal is present.

5. The system of claim 1, wherein the first filter is a low-pass filter.

6. The system of claim 1, wherein the boundaries of the first frequency range differ by a factor of 10 to 10,000 from the boundaries of the second frequency range.

7. The system of claim 1, further comprising a decoupling transmitter in the feed-in line.

8. The system of claim 1, further comprising a decoupling transmitter in the activation line.

9. The system of claim 1, further comprising a second filter in the feed-in line, said second filter corresponding to the first filter.

10. The system of claim 1, further comprising a third filter in the primary line and a fourth filter in the secondary line, wherein the third and the fourth filters let alternating-voltage signals from the first frequency range pass through while blocking them from the second frequency range.

11. The system of claim 10, wherein the third filter and the fourth filter are high pass filters.

12. A vehicle with a first vehicle part and at least one second vehicle part, which is movable relative to the first vehicle part, and a system for the contactless transfer of energy and data, the system comprising:
- a transfer path with at least one primary coil, connected by way of a primary line to a primary control unit, and at least one secondary coil connected by way of a secondary line to a secondary control unit;
- wherein the primary control unit is configured to lead data-modulated first alternating-voltage signals of a first frequency range into the primary coil; and
- wherein the secondary control unit is configured to receive the first alternating-voltage signals of the first frequency range from the secondary coil, and to demodulate the modulated-on data;
- a feed-in line connected to the primary line;
- an activation line connected to the secondary line; and
- a first filter arranged between the secondary line and an activation connection;
- wherein the first filter is permeable to second alternating-voltage signals of a second frequency range while blocking the first alternating-voltage signals of the first frequency range; and
- wherein the primary coil is attached to a first vehicle part, and the secondary coil is attached to a second vehicle part variably positionable relative to the first vehicle part.

13. The vehicle of claim 12, wherein the first vehicle part is a vehicle-fixed component.

14. The vehicle of claim 12, wherein the second vehicle part comprises a closeable container for oxygen masks, said container having a release mechanism connected to the activation connection and opening the container when the release mechanism receives the second alternating-voltage signal.

* * * * *